2,858,296

VULCANIZATION OF POLYURETHANE ELASTOMERS WITH DIISOCYANATES

Frederic B. Stilmar, Wilmington, Del., assignor to E. I. du Pont de Nemours and Company, Wilmington, Del., a corporation of Delaware No Drawing. Application February 17, 1955
Serial No. 489,000

15 Claims. (Cl. 260—75)

This invention relates to the preparation of polyurethane elastomers, and more particularly to a method of curing or vulcanizing such products.

Curable elastomers having valuable properties may be prepared by reacting a long-chain polyalkylene ether glycol with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in copending application Serial No. 365,270 of Hill, filed June 30, 1953. Similar products are obtained by reacting together a high molecular weight organic bischloroformate, an organic diamine and phosgene, as described in copending application Serial No. 461,657 of Carter and Ernsberger, filed October 11, 1954. Other useful polyurethane elastomers may be prepared by reacting a high molecular weight polyester with a molar excess of an organic diisocyanate and a chain-extending agent, as described for example by Bayer et al. in Angewandte Chemie, 62, 57–66 (1950).

Products of this type may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportion of reactants has been such that few free isocyanate groups are present, or if the uncured reaction product has been stabilized against premature curing by the addition of some material such as a primary or secondary amine which reacts with and ties up the free isocyanate groups, it is necessary to add a curing agent prior to heating to effect vulcanization. The curing agents ordinarily employed are diisocyanates. When the conventional diisocyanates such as the tolylene diisocyanates are used as curing agents, difficulty is often encountered because of the great reactivity of these compounds which results in premature curing or "scorching" of the elastomer before the curing agent can be thoroughly incorporated. This results in a non-uniform cure and interferes with the production of molded articles, since it may not be possible to force the partially cured product to fill the mold completely. The problem of scorching is partly overcome by the use of diisocyanates in which each isocyanate group is ortho to a substituent on the aromatic ring to which the isocyanate group is attached. Substituents on the aromatic ring in the ortho position exert an inhibiting effect on the reactivity of the isocyanate group, and compounds of this type consequently permit better control of the vulcanization reaction. Examples of this type of compound are the 1,3-bis(3-isocyanato-4-alkylphenyl)ureas and the corresponding compounds in which an alkoxy or a chlorine atom take the place of the alkyl substituent. Even with these compounds, however, scorching may occur on the rubber mill before the agent is completely mixed in.

It is an object of this invention to provide a method for curing polyurethane elastomers of the types hereinafter described which reduces the tendency toward scorching and which makes possible careful control of the desired degree of vulcanization.

It has now been found that, according to the present invention, a stable uncured polyurethane reaction product which is curable by heating with a polyisocyanate and which contains substantially no free isocyanate groups may be cured with reduced danger of scorching by first incorporating therewith from 0.5 to 2% by weight of an arylene diisocyanate in which one only of the isocyanate groups is ortho to a substituent on the aromatic ring, thereafter incorporating from 1 to 20% of an arylene diisocyanate in which each of the isocyanate groups is ortho to a substituent on the aromatic ring to which the isocyanate group is attached, and heating the mixture until a cured elastomer is formed.

In a preferred embodiment of this invention, the reaction product of a polytetramethylene ether glycol having a molecular weight between 750 and 3500, a molar excess of a tolylene diisocyanate, and water, said reaction product containing substantially no free isocyanate groups, is first mixed with from 0.5 to 2% by weight of 4-methoxy-m-phenylene diisocyanate, then with from 1 to 20% by weight of 1,3-bis(3-isocyanato-4-methylphenyl)urea, and the mixture is heated at a temperature between 90 and 150° C. to effect vulcanization.

Since diisocyanates in which both of the isocyanate groups are shielded by ortho substituents, as in the compound 1,3 - bis(3 - isocyanato-4-methylphenyl)urea, are known to be safer curing agents, i. e., to give rise to less scorching, than those diisocyanates in which only one of the isocyanate groups is so shielded, as in the compound 2,4-tolylene diisocyanate, it is entirely unexpected that a still further improvement in resistance to scorching is obtained by treating the uncured reaction product first with a small amount of this latter "unsymmetrical" type of diisocyanate and then with the former "symmetrical" type. The mechanism of this effect is not fully understood, but it is supposed that the more reactive isocyanate group in the unsymmetrical compounds is able to tie up the more reactive groups present in the polymer, possibly amino groups, and thus to prevent their reacting with the subsequently added curing agent.

The arylene diisocyanates in which one isocyanate is more reactive than the other include compounds having the formula

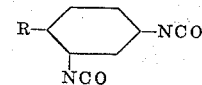

in which R represents a lower alkyl, lower alkoxy, or phenoxy radical or a halogen atom. Typical members of this class useful in the process of this invention are 2,4-tolylene diisocyanate, 4-tertiary-butyl-m-phenylene diisocyanate, 4-methoxy-m-phenylene diisocyanate, 4-propyloxy - m - phenylene diisocyanate, 4 - chloro-m-phenylene diisocyanate, 4-bromo-m-phenylene diisocyanate and 4-phenoxy-m-phenylene diisocyanate. Members of this class in which the substituent R contains no more than about 6 carbon atoms are preferred.

The diisocyanates having each isocyanate group shielded by an ortho substituent, which are useful as the second curing agent in the process of this invention, include 1,3-bis(isocyanatoaryl)ureas of the formula:

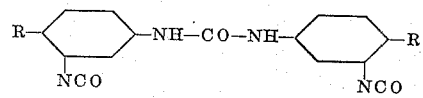

in which R is lower alkyl, lower alkoxy or chlorine, e. g., 1,3-bis(3-isocyanato-4-methylphenyl)urea.

The preferred amount of each of the diisocyanate curing agents used will depend somewhat on the nature and previous history of the uncured elastomer which is to be treated. It is desirable that from 0.5 to 2% by weight of the arylene diisocyanate having one unshielded isocyanate group be used. With less than 0.5%, no substantial improvement is secured, while at amounts greater than 2%, the product may begin to be more rather than less susceptible to scorching, due to the high reactivity of this diisocyanate. The amount of the second diisocyanate is somewhat less critical and may vary from 1 to 20%, although from 1 to 8% is ordinarily sufficient. In general the rate of cure increases with higher amounts of the diisocyanate curing agent.

In carrying out the process of this invention, the uncured elastomeric reaction product is mechanically worked on a rubber mill or other mixing equipment until it forms a smooth sheet. Compounding agents such as carbon black, plasticizer, and the like are added as desired. The necessary amount of the diisocyanate having one unshielded isocyanate group is added while milling is continued and, after thorough mixing, the proper amount of the diisocyanate having both isocyanate groups shielded by ortho substitute is milled in. The compounded mass is sheeted off the mill and cured, ordinarily by heating. Temperatures of 90 to 150° C. are normally used and only enough pressure is required to force the compounded elastomer into the mold. This may range from 30 to 40 pounds up to 3000 pounds per square inch. At the temperatures mentioned, 15 to 45 minutes are usually sufficient to produce a cure. Curing may be effected without the application of pressure. The compounded elastomer may be sheeted out and calendered either alone or onto a substrate such as a plastic or textile and may then be heated to produce the cure. It is also possible to cure the product without using either pressure or elevated temperature, but this ordinarily requires substantially longer times.

The polymeric reaction products which may be cured according to this invention include those which are prepared from polyalkylene ether glycols, diisocyanates and chain-extending agents, as disclosed and claimed in pending application Serial No. 365,270 of Hill, filed June 30, 1953. The term "polyalkylene ether glycol" as used throughout the specification and claims refers to a polyalkylene ether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the products of this invention may be represented by the formula $HO(RO)_nH$, in which R stands for an alkylene radical and $n$ is an integer sufficiently large that the molecular weight of the compound is at least 750, i. e., large enough that the polyoxyalkylene group $—(RO)_n—$ has a formula weight of at least 732. Not all of the alkylene radicals present need be the same. Glycols containing a mixture of radicals, as in the compound $HO(CH_2OC_2H_4O)_nH$ can be used. These glycols are either viscous liquids or waxy solids. To be of value in preparing elastomers according to this invention, the molecular weight of the glycol should be at least 750 and may be as high as 10,000. It is preferably between 750 and 3500. Polytetramethylene ether glycol, also known as polybutylene ether glycol, is the preferred glycol. Polyethylene ether glycol, polypropylene ether glycol and poly-1,2-dimethylethylene ether glycol are representative of other operable compounds.

Any of a wide variety of diisocyanates may be used in the polymerization. Aromatic diisocyanates, such as 2,4-tolylene diisocyanate, 4,4'-methylene-bis(phenyl isocyanate), 1,5-naphthylene diisocyanate and m-phenylene diisocyanate, are preferred. Aliphatic compounds such as hexamethylene diisocyanate and tetramethylene diisocyanate, and alicyclic compounds such as 1,4-cyclohexylene diisocyanate are also operable.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described by Kohler in J. Am. Chem. Soc., 49, 3181 (1927). When water is employed as the chain extender it is capable of reacting with two isocyanate groups with the evolution of carbon dioxide to form a urea group linking the polymer fragments to which the isocyanate groups were attached. Urea linkages are also formed if a diamine such as 2,4-tolylene-diamine or ethylene diamine is used as the chain-extending agent. Other useful chain extenders include ethylene glycol, adipamide, p-aminobenzoic acid, monoethanolamine, 1,4-cyclohexanedisulfonamide, succinic acid, and hydroxypropionic acid.

In the preparation of the polymer, an excess of the diisocyanate over the polyalkylene ether glycol is used, which may be only a slight excess or may be up to a 12:1 molar ratio. The glycol and the diisocyanate are ordinarily reacted by heating with agitation at a temperature of between 70° and 120° C. The chain-extending agent is then added and heating and mixing are continued at about 80° to 100° C. During this period the molecular weight of the reaction product increases and the mass gradually forms rubbery chunks. It is then removed from the mixer and sheeted out on a rubber mill. If all of the free isocyanate groups have not reacted with the glycol or the chain-extending agent, the elastomer will have a tendency to cure rather rapidly. If the reaction product is to be stored prior to the final curing step, it is then necessary to stabilize it by adding some material such as primary or secondary nitrogen base in amount sufficient to react with the remaining free isocyanate groups, as disclosed and claimed in application Serial No. 379,291 of Nelson et al., filed September 9, 1953. This stabilized polymer and the self-stabilized polymer which results when enough glycol and chain-extending agent have been used to tie up all the isocyanate groups may be stored for considerable periods without losing their ability to form a smooth band when milled on a rubber mill.

Instead of the hydrocarbon portion of the polyether glycols used in forming these products being entirely alkylene, the compound can contain arylene or cycloalkylene radicals together with the alkylene radicals as, for example, in the condensation product of a polyalkylene ether glycol with $\alpha,\alpha'$-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylylene radicals. Elastomers made using polyalkylene-arylene or polyalkylene-cycloalkylene ether glycols have improved freeze resistance as compared with the corresponding elastomers containing no cyclic radicals.

Another class of glycols useful in making polyurethanes curable according to this invention are the polyether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the glycol has a molecular weight of at least 750. These products may be made by condensing together glycols and thioglycols in the presence of a catalyst such as p-toluene sulfonic acid.

There may also be used as in the process of this invention products made by the reaction of a diisocyanate and a chain-extending agent with a long chain compound having a molecular weight of at least 750 and having at each end a functional group, said functional groups being connected by a hydrocarbon or a halogen-substituted hydrocarbon chain. The functional groups at the ends of the long chain compound are hydroxyl groups. The hydrocarbon chain connecting the functional groups is free of substituents other than halogen atoms and monovalent hydrocarbon radicals, such as methyl, phenyl, etc., preferably containing no more than 8 carbon atoms. Such long chain compounds are obtained, for example, by polymerizing ethylenically unsaturated monomers in the presence of free radical catalysts such as the aliphatic azo dinitriles or dicarboxylates. The most suitable ethylenically unsaturated monomers are conjugated dienes such as butadiene, isoprene, 2-chlorobutadiene and the like. Mixtures may be used. For example, styrene or isobutylene may be copolymerized with a diene to give the long chain skeleton. The carbon chain in the long chain compound may be saturated or unsaturated.

Also included in the products which may be cured according to this invention are those made from a high molecular weight, substantially linear polyester, an organic diisocyanate, and a chain-extending agent of the type previously described. Products of this sort are described in the aforementioned Bayer article in Angewandte Chemie, and in U. S. Patents 2,621,166, 2,625,531 and 2,625,532. The polyesters must have molecular weights of at least 750 and are prepared by reacting together glycols such as ethylene glycol, 1,2-propylene glycol, 2,3-butylene glycol, and 1,6-hexylene glycol, and dicarboxylic acids such as adipic, pimelic, sebacic, oxalic and phthalic acids and decamethylene dicarboxylic acid. The polyesters may be represented by the formula $$HO[R.OOC.R'.COO]_n ROH$$

in which R and R' are hydrocarbon radicals derived from the glycol and dicarboxylic acid respectively and $n$ is an integer large enough that the molecular weight of the compound as a whole is at least 750 and that the polyester group —[R.OOC.R'.COO]$_n$.RO— has a formula weight of at least 732. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates. The same diisocyanates, chain-extending agents and reaction conditions useful in preparing elastomers from the polyalkylene ether glycols are also useful with the polyesters.

Elastomers which are similar to those formed from the reaction between long chain glycols of the types mentioned above, diisocyanates and water may be made from the reaction of a high molecular weight organic bis-chloroformate, an organic diamine and phosgene, as described and claimed in pending application Serial No. 461,657 of Carter et al., filed October 11, 1954. These products may be cured advantageously by the process of this invention.

It is obvious from the above-described methods by which the uncured polyurethane reaction products may be prepared and the reactants used that these products will contain a plurality of intralinear radicals of the formula

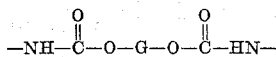

wherein the bivalent radical —O—G—O— is obtained by removing the terminal hydrogen atoms of a polymeric glycol, said glycol having a molecular weight of at least 750 and being selected from the group consisting of polyalkyleneether glycols, polyalkylene-aryleneether glycols, polyalkylene-cycloalkyleneether glycols, polyalkyleneether-polythioether glycols, poly-aliphatic hydrocarbon glycols, halogen-substituted poly-aliphatic hydrocarbon glycols and polyester glycols of the formula

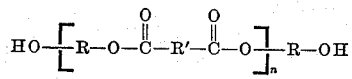

wherein R and R' are hydrocarbon radicals and $n$ is an integer.

The tendency of the compounded elastomers to cure prematurely or to scorch may be measured by the following tests.

130° C. MILL SCORCH TEST

In this test, 10 to 12 grams of the compounded elastomer containing the diisocyanate curing agent are put on a 2" x 6" rubber mill at about 30° C. and milling is begun. The temperature of the mill roll is raised to 90–100° C. with steam and held there for about 2 minutes. The mill roll temperature is then raised to 130° C. and held at that temperature. Milling is continued until the sample scorches or until a given time elapses without any scorching. Scorch is indicated by the appearance of holes in the band on the roll, the loss of tack and nerviness of the band and the formation of a dry crumbly bank at the nip of the rolls. Where scorching is severe, the polymer may crumble and fall off the mill. Scorch-resistance according to this test is measured in terms of the number of minutes until scorch is apparent, beginning when the temperature of the roll reaches 130° C.

EXTRUDER SCORCH TEST

Scorchiness may also be measured by extruding the polymer composition through a die, recycling the extruded material, and measuring the time elapsing until the extruded strip begins to have a rough surface. As employed in the examples which follow, the test is carried out using a Royle No. 4 extruder having a 6" worm screw turning at 18 R. P. M. The worm, barrel and head are heated to 93° C. with steam before introducing the compounded stock. The stock is then added and when it begins to emerge through the die, heating on the worm and barrel is discontinued and cold water is passed through, but the head is held at 93° C. with steam. The extruded strip is fed back into the feed barrel. The amount of composition used is such that there is on the average a 4 minute residence time in the extruder and 1 minute time on the outside before being fed back in. As extrusion continues, the strip is at first slightly nonuniform because of incomplete mixing. As extrusion continues, the band becomes smooth and homogeneous until the point when scorching begins. At this time a gradual surface roughness develops which soon becomes pronounced.

MOONEY SCORCH TEST

This is a standard method of determining the curing characteristics of elastomers by use of a shearing disc viscometer. It is ASTM Test D-0177-49 T as described in "ASTM Standards on Rubber Products," published by the American Society for Testing Materials. This test measures the change in viscosity of the curable mixture as a function of time, while the sample is held at a specific temperature. The compositions described in the examples which follow were tested at 100° C. using a small rotor.

The process of this invention is illustrated by the following examples, in which parts are by weight unless otherwise indicated.

*Example 1*

There are mixed in a Werner-Pfleiderer mixer 500 parts of polytetramethylene ether glycol having a molecular weight of 2400 and containing 0.02% water and 44.5 parts of 2,4-tolylene diisocyanate for 3.5 hours while maintaining a temperature of 130° C. on the jacket of the mixer. 7.5 parts of m-tolylene diamine are added and mixing is continued for thirty minutes more. The product is then a taffy-like mass which is removed from the mill after cooling.

Portions of this polymer are compounded with diisocyanate curing agents as shown in the following table. In each case, the polymer is milled to a smooth sheet on a rubber mill, the diisocyanate having one shielded isocyanate group is milled in (except in control samples A and B in which this compound is omitted), and then 1,3-bis-(3-isocyanato-4-methylphenyl)urea is milled in. A portion is subjected to the 130° C. mill scorch test. The results are as follows:

| No. | Unsymmetrical Diisocyanate | | Parts of Diisocyanatoaryl urea/100 parts Elastomer | Scorch Time, Minutes | Remarks |
|---|---|---|---|---|---|
| | Type | Parts/100 parts Elastomer | | | |
| A | None | | 4 | 1 | Fell off mill in 2 minutes. |
| B | do | | 1.5 | 5 | |
| C | 2,4-tolylene diisocyanate | 1.4 | 1.5 | >20 | Band still smooth at 20 minutes. |
| D | 4-tert. butyl-m-phenylene diisocyanate. | 1.6 | 1.5 | >25 | Band still smooth and tacky at 25 minutes. |
| E | 4-methoxy-m-phenylene diisocyanate. | 1.5 | 1.5 | >30 | Band still smooth at 30 minutes. |
| F | do | 1.5 | 4.0 | >15 | |
| G | do | 0.5 | 3.0 | 12 | |

It is apparent from these results that the scorch resistance is increased very substantially by the addition of the small amount of unsymmetrical diisocyanate.

*Example 2*

1300 parts of polytetramethylene ether glycol having an average molecular weight of 2420 and containing 0.02% water and 115 parts of 2,4-tolylene diisocyanate are mixed in a Werner-Pfleiderer mixer for 3.5 hours at 130° C. There are then added 22.4 parts of m-tolylene diamine and mixing is continued for an additional half hour. The mass is cooled and the elastomer removed from the mixer.

100 parts of the polymer are milled to a smooth band on a rubber mill and 5 parts of 1,3-bis(3-isocyanato-4-methylphenyl)urea are milled in. This composition shows a 130° scorch time of 5 minutes.

Another 100 part portion of the polymer is milled to a smooth band and 2 parts of 4-methoxy-m-phenylene diisocyanate are milled in. When this is thoroughly incorporated, 3 parts of 1,3-bis(3-isocyanato-4-methylphenyl)urea are milled in. The 130° C. scorch time is longer than 15 minutes since when the test is discontinued at that time the band on the mill is still shiny and nervy and shows no indication of scorch.

*Example 3*

1350 parts of polytetramethylene ether glycol of molecular weight 2340 and containing 0.28% water and 211 parts of 2,4-tolylene diisocyanate are mixed in a Werner-Pfleiderer mixer at 70° C. for 3 hours. There are then added 53.1 parts of water and mixing is continued for an additional 28 minutes during which time the temperature rises to 95° C. To the resultant rubbery mass there are then added 12.5 parts of N-methylethanolamine and mixing is continued for an additional 15 minutes. The resulting elastomer is removed from the mixer, milled on a rubber mill and sheeted off.

Portions are compounded as shown in the following table, in each case milling in the diisocyanate listed first before the other is added, and the Mooney scorch test run on the compounded stock. The results are shown below the compositions. The composition figures denote parts by weight.

| Sample | A | B | C | D |
|---|---|---|---|---|
| Elastomer prepared above | 100 | 100 | 100 | 100 |
| Easy Processing Channel Black | | | 15 | 15 |
| 4-Methoxy-m-phenylene diisocyanate | | 1 | | 1 |
| 1,3-bis(3-isocyanato-4-methyl-phenyl)urea | 8 | 8 | 8 | 8 |
| Mooney Scorch at 100° C.: | | | | |
| Low reading (minimum viscosity) | 34 | 25 | 39 | 27 |
| Minutes to reading of 50 | 17 | 31 | 15 | 20 |

Inspection of these data shows that the low reading is roughly 10–12 points lower when the 4-methoxy-m-phenylene diisocyanate is used and that a correspondingly longer time of milling is permissible before the value reaches 50.

*Example 4*

215 parts of polytetramethylene ether glycol of average molecular weight 970 and 26 parts of 2,4-tolylene diisocyanate are mixed together in a Werner-Pfleiderer mixer at 100° C. for 3 hours. The polyurethane thus formed having terminal hydroxyl groups and a molecular weight of 3260 is cooled at 70–75° C. and 0.36 part of water is mixed in. 29.6 parts of 2,4-tolylene diisocyanate are added and mixing is continued for an additional 2 hours at 70–75° C. There are then added 9.3 parts of water and mixing is continued for 19 minutes. The temperature rises to 100° C. The rubbery mass is discharged from the mixer and milled on a rubber mill with 1.85 parts of piperidine to form a stabilized polymer. The elastomer is then sheeted off the mill.

The polymer is compounded in three batches on a rubber mill as follows (parts being by weight):

| | A | B | C |
|---|---|---|---|
| Elastomer | 100 | 100 | 100 |
| 2,4-Tolylene diisocyanate | | 1 | |
| 4-Methoxy-m-phenylene diisocyanate | | | 1 |
| 1,3-bis(3-isocyanato-4-methylphenyl)urea | 4 | 4 | 4 |

In samples B and C, the first diisocyanates are thoroughly milled in before the urea is added, this requiring about 10–15 minutes at a mill roll temperature of 35–40° C.

These formulations are tested for scorch properties by the Mooney viscosity method (ASTM D–1077–49T) at 100° C. In this test the low reading (minimum viscosity) is taken as the point from which the scorching must start. The time necessary to go from the low reading to a given Mooney reading is a measure of relative scorchiness. The observed readings are given in the table below.

MOONEY READING AT 100° C.

| Elapsed Time, Minutes | A | B | C |
|---|---|---|---|
| 0 | 100 | 92 | 100 |
| 1 | 74 | 71 | 68 |
| 2 | 75 | | 67 |
| 3 | 74 | | |
| 4 | 72 | 70 | 64 |
| 5 | | 67 | 61 |
| 6 | 71 | | 58 |
| 7 | | 65 | 57 |
| 8 | | 64 | |
| 10 | | 67 | |
| 11 | 72 | | 58 |
| 12 | | 69 | |
| 13 | 72 | | 59 |
| 14 | 74 | | |
| 15 | 75 | 71 | 60 |
| 17 | 77 | | 62 |
| 18 | 78 | 72 | |
| 19 | 79 | | |
| 20 | 80 | | 64 |
| 24 | 84 | | 66 |
| 25 | | 77 | |
| 27 | 87 | 79 | 69 |
| 32 | 91 | 83 | 72 |
| 35 | | 86 | 73 |
| 39 | | | 77 |

Inspection of the table shows the considerable improvement in scorch properties resulting from addition of the partially hindered diisocyanates.

*Example 5*

(A) *Preparation of polyurethane.*—950 parts of polytetramethylene ether glycol of molecular weight 945 containing 0.02% water and 117.5 parts of 2,4-tolylene diisocyanate are stirred together for 3 hours at 100–105° C. The resulting polyurethane has hydroxyl end groups, a molecular weight of 3180, and no free —NCO groups.

(B) *Preparation of elastomer.*—2775 parts of polytetramethylene ether glycol of molecular weight 925 and 351.5 parts of 2,4-tolylene diisocyanate are stirred together at 100–105° C. for 3 hours. 200 parts of the resulting viscous liquid are put in a Werner-Pfleiderer mixer with 0.36 part of water and mixed for 15 minutes while the temperature is adjusted to 70–75° C. Then 23.3 parts of 2,4-tolylene diisocyanate are added and mixing is continued for 2 hours at 70–75° C. 8.06 parts of water are added and mixing is continued for 20 minutes while the temperature increases from 70° C. to 100° C. The rubbery mass is removed from the mixer promptly and milled on a rubber mill where 0.18 part of piperidine is added per 100 parts of polymer for the purpose of stabilization.

(C) *Preparation and testing of compounded stock.*— The following formulations are compounded on a rubber mill (parts being by weight):

| | I | II |
|---|---|---|
| Elastomer B above | 100 | 100 |
| High abrasion furnace black | 15 | 15 |
| Polyurethane A above | 15 | 15 |
| 4-methoxy-m-phenylene diisocyanate | 1 | |
| 1,3-bis(3-isocyanato-4-methylphenyl)urea | 7 | 8 |

The ingredients are added to the mill rolls in the order shown.

These two stocks are subjected to the extruder scorch test described above. Sample I extrudes significantly longer than sample II. Sample II begins to show signs of scorch at 25–30 minutes, while sample I does not show signs of scorch until 45–50 minutes. The temperature in these tests ranged from about 140° C. to 150° C.

The Mooney scorch figures at 100° C. on these two stocks are:

| | I | II |
|---|---|---|
| Low reading | 41 | 49 |
| Minutes to 10 point rise | 34 | 26 |

These tests also show the improvement in scorch properties caused by the preliminary addition of 4-methoxy-m-phenylene diisocyanate.

*Example 6*

2730 parts of polytetramethylene ether glycol of molecular weight 910 and 351.5 parts of 2,4-tolylene diisocyanate are stirred together for 3 hours at 100–105° C. to form a polyurethane having a calculated molecular weight of 3078.

200 parts of the polyurethane are placed in a Werner-Pfleiderer mixer and mixed with 0.37 part of water for 15 minutes at 70° C. Then 26 parts of 2,4-tolylene diisocyanate are added and mixing at 70–75° C. is continued for 2 hours. 8.2 parts of water are added and mixing is continued for an additional 25 minutes while the temperature rises from 70° C. to 100° C. The rubbery mass is then removed from the mixer and sheeted out on a rubber mill while 0.66 part of piperidine per 100 parts of polymer is milled in to stabilize it.

The polymer is peptized to reduce its viscosity by blending in 0.25 part of N-methylethanolamine for each 100 parts of elastomer on the rubber mill and transferring to the Werner-Pfleiderer mixer where it is mixed for 15 minutes, the temperature rising from 100° C. to 135° C. Cooling is necessary at the latter part of the mixing to keep the temperature at 135° C. The charge is removed from the mixer in the form of rubbery chunks which are sheeted off the rubber mill in a smooth sheet.

Portions of the elastomer are compounded by first milling the polymer at 100° C. on a rubber mill for 10 minutes, adding the 4-substituted m-phenylene diisocyanate as shown in the table and milling for 10 minutes at 100° C., and finally milling with 1,3-bis(3-isocyanato-4-methylphenyl)-urea for 10 minutes at 100° C. A Mooney scorch test is then run on the sample using the small rotor at 100° C. The compositions and results of the scorch test are shown in the table below (parts are by weight):

| | A | B | C | D | E |
|---|---|---|---|---|---|
| Elastomer | 100 | 100 | 100 | 100 | 100 |
| 4-Methoxy-m-phenylene diisocyanate | | 1 | | | |
| 4-Phenoxy-m-phenylene diisocyanate | | | 1 | 1.3 | |
| 4-Chloro-m-phenylene diisocyanate | | | | | 1 |
| 1,3-bis(3-isocyanato-4-methylphenyl)-urea | 8 | 7 | 7 | 6.7 | 7 |
| Low Mooney reading | 53 | 39 | 43 | 41 | 50 |
| Minutes to Mooney reading of 63 (10 point rise for Control "A") | 30 | 46 | 60 | 86 | 69 |

It is apparent that the processing safety from the scorch standpoint is increased from 50 to about 200% by the use of the two different types of diisocyanates.

Although this invention is particularly useful and has been illustrated with particular reference to elastomers formed from polyalkylene ether glycols, diisocyanates and chain extending agents, it has application generally to the curing of any elastomeric materials composed of polymeric chains containing reactive hydrogen atoms and which may be cured by cross-linking at the active hydrogen sites.

The process of this invention in which diisocyanates of different type are added in turn as curing agents unexpectedly permits longer milling of the polymer without scorching than is possible with either type of diisocyanate alone. Some uncured elastomers of the type here considered may be milled to a smooth band on a cold mill, i. e., one to which no heat is applied, although the actual temperature may build up to as high as 50° C. by friction. On the other hand, with some elastomers it is necessary to heat the mill to around 100° C. in order to obtain a smooth band. The tendency for scorching to take place is greater at the higher temperatures and under these conditions the use of the two-step process here described is of particular value.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles.

The basic elastomeric properties of these products may be varied by suitable compounding. The type and amount of the compounding agent to be used is dependent upon the use for which the elastomer is intended. Some of the more important compounding agents which are of value with these elastomers are carbon black, clay, silica, talc, zinc and magnesium oxides, calcium and magnesium titanium dioxide and plasticizers. Inorganic and organic coloring agents may be incorporated to give well defined colored products. The natural color of the elastomer is a pale yellow or a light amber.

The compounding agents may be mixed or incorporated with the product at the same time that the diisocyanate vulcanizing agents are added. Conventional rubber processing machinery such as rubber mills and Werner-Pfleiderer or Banbury mixers may be used. The resulting compounded stocks may be shaped or cured in conventional rubber industry equipment. Alternatively, the stocks may be dissolved or extended with solvents for application to surfaces upon which they may be cured after evaporation of the solvent.

What is claimed is:

1. The process of curing a stable uncured polyurethane reaction product, which is curable by heating with a polyisocyanate and which contains substantially no free isocyanate groups, said polyurethane reaction product containing a plurality of intralinear radicals of the formula

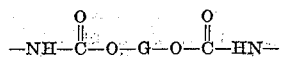

wherein the bivalent radical —O—G—O— is obtained by removing the terminal hydrogen atoms of a polymeric glycol, said glycol having a molecular weight of at least 750 and being selected from the group consisting of polyalkyleneether glycols, polyalkylene-aryleneether glycols, polyalkylene-cycloalkyleneether glycols, polyalkyleneether-polythioether glycols, poly-aliphatic hydrocarbon glycols and polyester glycols of the formula

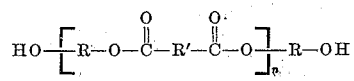

wherein R and R' are hydrocarbon radicals and $n$ is an integer, which comprises thoroughly blending therewith by milling from 0.5 to 2% by weight of an arylene diisocyanate in which one only of the isocyanate groups is ortho to a substituent on the aromatic ring, said substituent being selected from the group consisting of lower alkyl, lower alkoxy and phenoxy radicals and halogen atoms, thereafter incorporating by milling from 1 to 20% by weight of an arylene diisocyanate of the formula

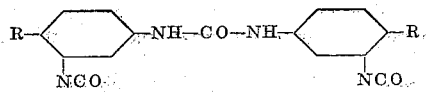

wherein R is selected from the group consisting of lower alkyl, lower alkoxy and chlorine, and heating the mixture to a temperature of from about 90 to 150° C. until a cured elastomer is formed.

2. The process of claim 1 in which the diisocyanate having only one isocyanate group ortho to a substituent on the aromatic ring is 2,4-tolylene diisocyanate.

3. The process of claim 1 in which the diisocyanate having only one isocyanate group ortho to a substituent on the aromatic ring is 4-methoxy-m-phenylene diisocyanate.

4. In the process of curing a stable uncured polyurethane reaction product which is curable by heating with a polyisocyanate and which contains substantially no free isocyanate groups, said polyurethane reaction product containing a plurality of intralinear radicals of the formula

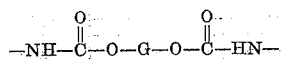

wherein the bivalent radical —O—G—O— is obtained by removing the terminal hydrogen atoms of a polymeric glycol, said glycol having a molecular weight of at least 750 and being selected from the group consisting of polyalkyleneether glycols, polyalkylene-aryleneether glycols, polyalkylene-cycloalkyleneether glycols, polyalkyleneether-polythioether glycols, poly-aliphatic hydrocarbon glycols, halogen-substituted poly-aliphatic hydrocarbon glycols and polyester glycols of the formula

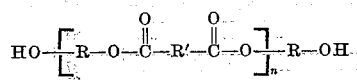

wherein R and R' are hydrocarbon radicals and $n$ is an integer, the steps which comprise thoroughly blending by milling with the said reaction product from 0.5 to 2% by weight of an arylene diisocyanate in which one only of the isocyanate groups is ortho to a substituent on the aromatic ring, said substituent being selected from the group consisting of lower alkyl, lower alkoxy and phenoxy radicals and halogen atoms, and thereafter incorporating by milling from 1 to 20% by weight of an arylene diisocyanate of the formula

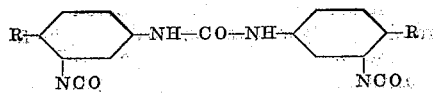

wherein R is selected from the group consisting of lower alkyl, lower alkoxy and chlorine and thereafter heating to a temperature of from about 90 to 150° C. until an elastomer is formed.

5. The process of claim 4 in which the diisocyanate having one only of its isocyanate groups ortho to a substituent on the aromatic ring has the formula

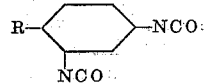

in which R is a member of the class consisting of lower alkyl, lower alkoxy and phenoxy radicals and halogen atoms.

6. The process of claim 5 in which the uncured polyurethane reaction product is formed from the reaction of a polyalkylene ether glycol having a molecular weight of at least 750, a molar excess of an organic diisocyanate, and a chain extending agent containing a plurality of active hydrogen atoms, no more than two atoms in the molecule having active hydrogen attached thereto.

7. The process of curing a stable uncured reaction product of a polytetramethylene ether glycol having a molecular weight of at least 750, a molar excess of tolylene diisocyanate and water, said reaction product containing substantially no free isocyanate groups, which comprises thoroughly blending therewith by milling from 0.5 to 2% by weight of 2,4-tolylene diisocyanate, thereafter incorporating by milling from 1 to 20% of 1,3-bis(3-isocyanato-4-methylphenyl)urea and heating the mixture at a temperature between 90 and 150° C. to produce a vulcanized elastomer.

8. The process of curing a stable uncured reaction product of a polytetramethylene ether glycol having a molecular weight of at least 750, a molar excess of tolylene diisocyanate and water, said reaction product containing substantially no free isocyanate groups, which comprises thoroughly blending therewith by milling from 0.5 to 2% by weight of 4-methoxy-m-phenylene diisocyanate, thereafter incorporating by milling from 1 to 20% of 1,3-bis(3-isocyanato-4-methylene)urea and heating the mixture at a temperature between 90 and 150° C. to produce a vulcanized elastomer.

9. The process of curing a stable uncured reaction product of a polytetramethylene ether glycol having a molecular weight of at least 750, a molar excess of tolylene diisocyanate and water, said reaction product containing substantially no free isocyanate groups, which comprises thoroughly blending therewith by milling from 0.5 to 2% by weight of 4-chloro-m-phenylene diisocyanate, thereafter incorporating by milling from 1 to 20% of 1,3-bis(3-isocyanato-4-methylphenyl)urea and heating the mixture at a temperature between 90 and 150° C. to produce a vulcanized elastomer.

10. The process of curing a stable uncured reaction product of a polytetramethylene ether glycol having a molecular weight of at least 750, a molar excess of tolylene diisocyanate and water, said reaction product containing substantially no free isocyanate groups, which comprises thoroughly blending therewith by milling from 0.5 to 2% by weight of 4-phenoxy-m-phenylene diisocyanate, thereafter incorporating by milling from 1 to 20% of 1,3-bis(3-isocyanato-4-methylphenyl)urea and heating the mixture at a temperature between 90 and 150° C. to produce a vulcanized elastomer.

11. A cured elastomer obtained by the process of claim 1.

12. A process according to claim 1 in which the heating step is carried out in a mold under pressure to form a shaped, vulcanized elastomer.

13. A shaped, vulcanized elastomer obtained by the process of claim 12.

14. The process of claim 1 in which the bivalent radical —O—G—O— in the polyurethane reaction product is obtained by removing the terminal hydrogen atoms of a polyalkyleneether glycol.

15. The process of claim 14 wherein the polyalkyleneether glycol is a polytetramethyleneether glycol.

References Cited in the file of this patent

UNITED STATES PATENTS

| | | |
|---|---|---|
| 2,531,392 | Breslow | Nov. 28, 1950 |
| 2,625,531 | Seeger | Jan. 13, 1953 |
| 2,692,873 | Langerak et al. | Oct. 26, 1954 |
| 2,749,960 | Schwartz | June 12, 1956 |
| 2,777,831 | Seeger et al. | Jan. 15, 1957 |

UNITED STATES PATENT OFFICE
CERTIFICATE OF CORRECTION

Patent No. 2,858,296                                                          October 28, 1958

Frederic B. Stilmar

It is hereby certified that error appears in the printed specification of the above numbered patent requiring correction and that the said Letters Patent should read as corrected below.

Column 3, line 24, for "substitute" read -- substituents --; column 6, line 62, for "D-0177-" read -- D-1077- --; column 8, line 44, for "at" read -- to --; column 11, line 45, after "glycols", first occurrence, insert --,halogen-substituted poly-aliphatic hydrocarbon glycols --.

Signed and sealed this 10th day of February 1959.

(SEAL)
Attest:

KARL H. AXLINE                                              ROBERT C. WATSON
Attesting Officer                                         Commissioner of Patents